United States Patent [19]

van den Brink

[11] 4,449,915

[45] May 22, 1984

[54] CLOSURE SYSTEM FOR LIQUID INJECTION APPARATUSES

[75] Inventor: Anthonie van den Brink, Westmaas, Netherlands

[73] Assignee: Eurotool B.V., Westmaas, Netherlands

[21] Appl. No.: 349,731

[22] Filed: Feb. 18, 1982

[30] Foreign Application Priority Data

Feb. 18, 1981 [NL] Netherlands .......................... 8100791

[51] Int. Cl.³ .............................................. B29F 1/03
[52] U.S. Cl. ..................................... 425/564; 222/506; 222/509; 222/560; 264/328.8; 425/562; 425/570
[58] Field of Search ............... 425/564, 566, 565, 562, 425/563, 570; 222/560, 505, 509, 506; 264/328.8

[56] References Cited

U.S. PATENT DOCUMENTS

| | | | |
|---|---|---|---|
| 3,094,254 | 6/1983 | Cullen et al. | 222/504 |
| 3,349,155 | 10/1967 | Valyi | 425/149 X |
| 3,371,384 | 3/1968 | Nouel | 18/30 |
| 3,372,433 | 3/1968 | Nouel | 425/558 X |
| 4,108,956 | 8/1978 | Lee | 264/329 |
| 4,212,627 | 7/1980 | Gellert | 425/564 |
| 4,272,236 | 6/1981 | Rees et al. | 425/564 |
| 4,330,258 | 5/1982 | Gellert | 425/564 |

FOREIGN PATENT DOCUMENTS

| | | |
|---|---|---|
| 2513594 | 3/1975 | Fed. Rep. of Germany . |
| 275511 | 10/1964 | Netherlands . |
| 289455 | 3/1965 | Netherlands . |
| 712256 | 1/1980 | U.S.S.R. . |

*Primary Examiner*—Donald E. Czaja
*Assistant Examiner*—James C. Housel
*Attorney, Agent, or Firm*—Ladas & Parry

[57] ABSTRACT

Known apparatuses to inject liquids, in particular plastics into injection moulds have closure rods which remain in the gating when the closure system is opened. In the present apparatus the liquid passage always is completely free when the closure system is opened, because the closure rod can be totally retracted from the liquid passage. This can be accomplished in two ways: either the liquid passage extends in a bended manner or the closure rod has a side view in the configuration of a sector or a circle.

12 Claims, 3 Drawing Figures

CLOSURE SYSTEM FOR LIQUID INJECTION APPARATUSES

BACKGROUND OF THE INVENTION

This invention relates to a closure system for use in apparatuses for the interruption of the injection of liquids into cavities, in particular liquids under a relatively high pressure and/or at relatively high temperatures, such as plastics, which are injected into injection moulds via a liquid passage, defined by a central body or inner sleeve, said closure system being provided with a closure rod which can be retractably placed in a gating of the liquid passage, said closure rod having cross-sectional dimensions which are substantially equal to the dimensions of the gating.

The known closure systems all function with a closure rod which remains in the gating when the closure system is opened. Further it is a disadvantage of the known system, that the driving mechanism of the closure rod has to be positioned directly above the sprue nozzle with a spring system or a hydraulic/pneumatic cylinder, or via a lever system next to the sprue nozzle. It is also a disadvantage, that the position of the closure rod will change when the manifold is expanded because of differences in temperature.

As a result, known systems are complicated and expensive. Because the annular section of the liquid passage contacts the materials over a relatively long distance, large current resistances appear during the passage of the synthetic materials, caused by adhering forces.

SUMMARY OF THE INVENTION

The present invention overcomes these objections and provides a compact closure system; the mechanism for effecting the closure not having to be inboarded in the manifold. The invention also makes the liquid passage completely free; a relatively short stroke being used. Therewith it can be reached that the liquid passage always has a circular, and therefore no annular cross-section, which significantly decreases the current resistance and together therewith the injection energy in the case of the injection of synthetic materials.

The invention also provides a solution for the problem of simultaneously operating a number of closure systems.

According to the invention this is accomplished, because the closure rod can be totally retracted from the liquid passage so as to expose the latter completely.

The general characterizing feature of the invention can be brought into practice in two different ways.

The embodiment which is preferred is characterized in that the liquid passage extends in a bended manner, whereas the closure rod extends through the wall of the central body to at least one chamber where it is coupled to driving means. Said driving means comprise for example at least one comb, supported by a shaft, said comb having two tooth cavities, which are at an angular distance of approximately 90° from one another and are defined by involute pressure areas, one of said cavities being coupled to the closure rod and the other one to a pull rod. The chamber can herewith consist of two cylindrical chambers, in each of which a comb is placed, said chambers being separated by a wall with a spindle opening.

The second embodiment for bring the invention into practice is characterized in that the closure rod has a side view in the configuration of a sector of a circle, while in the inner sleeve near the gating at least one hole for the passage of the closure rod is provided. The end of the closure rod, opposite the gating, is coupled to a slider which is reciprocable in a channel having such a height in the plane of the closure rod that when the closure rod is mounted, it can be coupled with the slider. This closure rod is for example provided with a pin, extending transversely to the plane of the closure rod, said pin fitting in a fork of the slider, said fork having such a height that in the open condition the pin just cooperates with the fork.

BRIEF DESCRIPTION OF THE DRAWINGS

The invention will be further elucidated hereunder by the drawing, in which two embodiments of a closure system according to the invention are shown by way of example. In the drawing.

DESCRIPTION OF THE PREFERRED EMBODIMENTS

Figure 1:
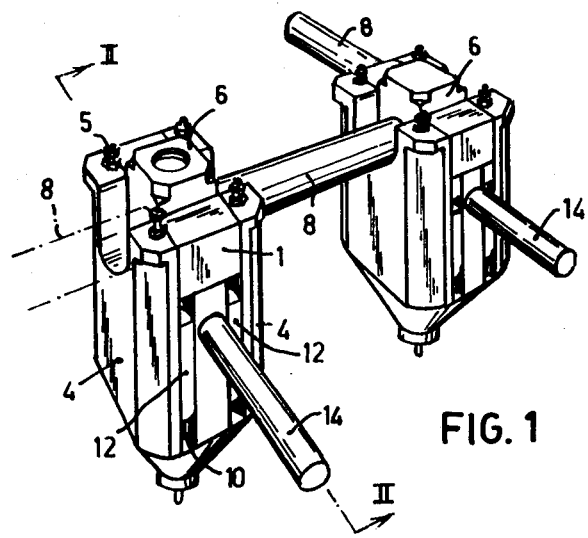
FIG. 1 shows in perspective two sprue nozzles mutually connected by manifold pipes.
Figure 2:
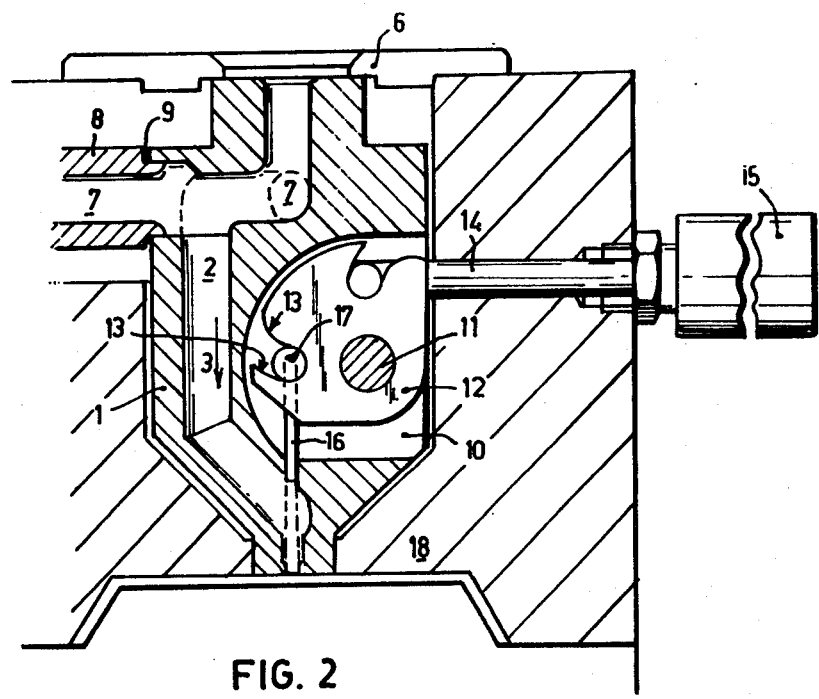
FIG. 2 shows a section according to the line II-II of FIG. 1 with the closure rod in the open position.

The closure system shown in FIGS. 1 and 2 comprises a central body 1 having a C-shaped liquid passage 2. The injection direction of the liquid is represented by arrow 3 of FIG. 2.

At both sides of the central body 1 two cover plates 4 are mounted, as shown in FIG. 2, in which heating elements (not shown) possibly with a thermo-couple can be found. The outer ends thereof are indicated at 5.

Above the central body 1 a cover 6 is mounted by means of bolts (not shown), from which in FIG. 1 the left sample does have an opening in the upper surface and the right sample does not. To said opening a liquid supply can be connected. The mutual connection between the central bodies can be obtained via a feed opening 7 (FIG. 2) of the liquid passage 2 in one of the surfaces of the central body 1.

The feed openings 7 of the central bodies can be mutually connected by means of clamped pipe segments 8, possibly additionally encircled by (now shown) heating elements, which segments absorb the heat expansion without leakage due to seals 9.

The apparatus of the invention is shown in FIG. 2 in an injection mould, only the front plate 18 thereof being indicated.

The central body 1 comprises two cylindrical chambers 10, connected through a spindle opening. Each chamber houses a gear or rotary cam 12 which are connected by an intermediate shaft 11. Said rotating cams have two pairs of involute pressure areas 13 and are driven by the shaft 11 or by a pull rod 14.

The rotating shaft 11 can also simultaneously close a number of closure systems. The rotational movement of the shaft can be obtained with the usual techniques by a hydromotor, electromotor or such. The pull rod 14 can also obtain an independent movement by connecting each rod per closure system to a controlled air- or hydraulic cylinder 15.

The end of a closure rod 16 facing away from the gating is provided with a pin 17 which can be moved up and down while engaged with the pressure areas 13 of the rotating cams.

It is of course also possible to operate with one rotating comb 12 when the couplings of the pull rod 14 and the closure rod are formed as an eye (not shown).

Figure 3:
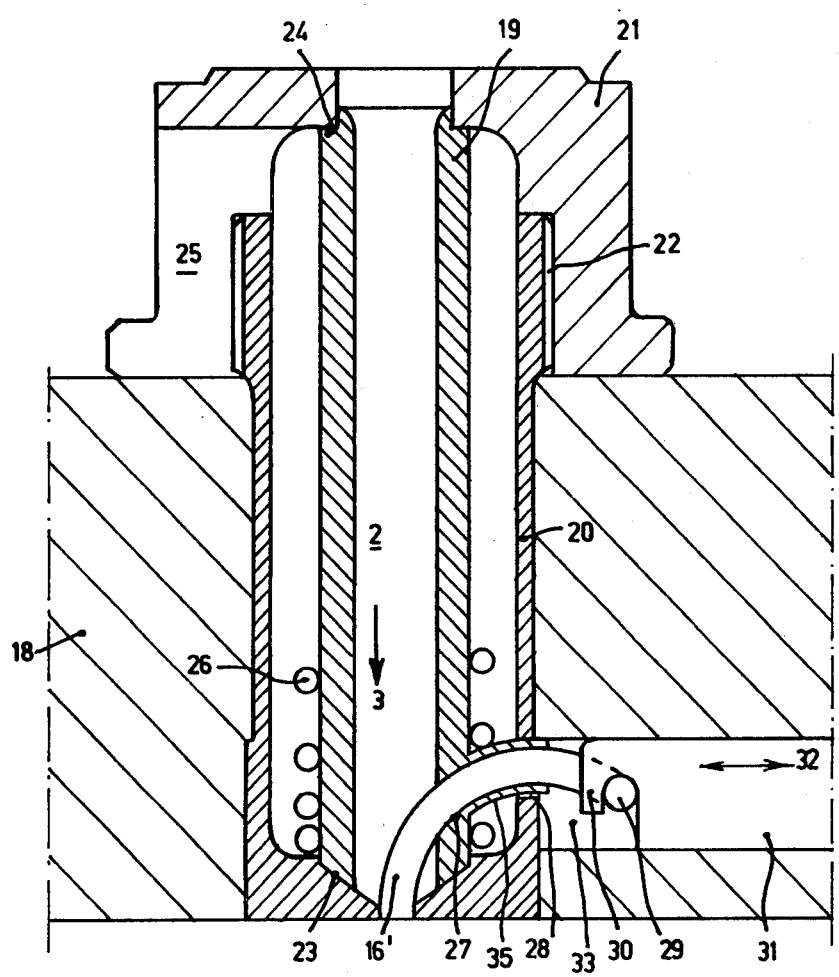
FIG. 3 shows a longitudinal section of another embodiment with the closure rod in the closed position.

The closure system shown in FIG. 3 comprises an inner sleeve 19 which encloses a cylindrical liquid-passage 2, in which the injection direction of the liquid in the sense of arrow 3.

The inner sleeve 19 is surrounded by a casing 20 and a cap 21 which can cooperate for closing the inner sleeve between the seats 23 and 24, by screw thread. The cap 21 has a passage 25 through which cables (not shown) for the schematically indicated heating element 26 and possible other electrical devices, like a thermocouple, pass.

The apparatus of the invention is here shown in a so-called manifold of an injection mould, only the front plate 18 thereof being indicated.

The characterizing feature of this second embodiment of the closure system is found in a circle-sector shaped closure rod 16' in side view, which exactly fits in the gating of the inner sleeve 19 and in a precisely fitting hole 27, for example formed in the inner sleeve by spark cutting. The closure rod 16' also extends through an opening 28 of the casing 20 but opening 28 does not have to be exactly fitting. It is noted that the end of the closure rod which is positioned in the gating can also be embodied with a conical point which can rest against a conical seat.

At the end opposite the gating of the inner sleeve 19, the closure rod is provided with a pin 29 at least extending to one side out of the plane of the drawing, said pin engaging with a fork 30 of a slider 31, which is reciprocable in the sense of the double arrow 32. When the slider 31 is moved to the right in the drawing, the closure rod 16' leaves the gating, which then is completely opened. It is also possible, that during the opening only the movement of the slider 31 to the right is allowed, and that the real movement is caused by the pressure which is exerted on the closure rod 16' by the liquid.

The height of the fork 30 has to be such, that in the opened position of the closure rod 16', that is the position in which not a single part of the closure rod is extending in the liquid passage 2, the pin still engages with the fork. The height of the channel 33 however has to be such, that the pin 29 can pass under the fork, because otherwise one cannot mount and release the latter.

The opening 28 in the casing 20 is depicted perpendicular to the flow direction 3 in the drawing, but opening 20 could of course also be at an angle and further the hole 27 and the hole 28 could also be connected by a sleeve 35, by which it is guaranteed that possible leakage liquid cannot reach the heating elements 26. The leakage liquid would then come into channel 33 which must therefore be cleaned sometimes. Also for that reason it is desired that the closure rod 16' and the slider 31 can be easily and quickly connected and disconnected.

By working with sliders 31 it is very easy to connect the action of a number of closure systems and because of that a simultaneous operation of several sprue nozzles is possible.

Embodiments other than those shown in the drawings are intended to fall within the scope of the claims.

What is claimed is:

1. A closure system for use in liquid injection apparatuses for interrupting the injection of liquids into cavities, in particular liquids under a relatively high pressure and/or at relatively high temperatures, like plastics which are injected into injection moulds via a liquid passage, defined by a central body (1), said closure system having a closure rod which can be retractably placed in a gating of the liquid passage, said liquid passage (2) extending in a bended manner, the closure rod (16) extending through a wall of the central body (1), said gating being located at a bend in said liquid passage, said bend being situated above cross-sectional termination of said liquid passage in said central body, said closure rod having cross-sectional dimensions which are substantially equal to the dimensions of said gating, the closure rod (16) being totally retracted from the liquid passage (2) so as to expose the latter completely, said central body (1) comprising two cylindrical chambers (10), in each of which a cam (12) is placed, said chambers being separated by a wall with a spindle opening, an intermediate shaft (11) extending through said opening and connecting the cams so that they rotate simultaneously, each cam having two cavities angularly spaced by approximately 90°, said cavities being defined by involute pressure areas (13), one of said cavities of said cam being coupled to the closure rod (16) and the other cavity of said cam being coupled to a pull rod (14), whereby rotation of shaft (11) simultaneously closes a plurality of liquid passages.

2. A closure system according to claim 1, in which an end of the closure rod (16) opposite the gating, has a pin (17), extending transversely to a plane defined by a longitudinal axis of the closure rod, which pin fits in a cavity of the cam.

3. A closure system according to claim 1, in which the gating and the closure rod (16) have circular transverse cross-sections.

4. A closure system according to claim 1, in which the closure rods of various closure systems are mutually connected so as to be simultaneously opened and closed.

5. A closure system for use in liquid injection apparatuses for interrupting the injection of liquids into cavities, in particular liquids under a relatively high pressure and/or at relatively high temperatures, like plastics which are injected into injection molds via a liquid passage, defined by an inner sleeve (19), said closure system having a closure rod which can be retractably placed in a gating of the liquid passage, said closure rod having cross-sectional dimensions which are substantially equal to cross-sectional dimensions of the gating, wherein the improvement comprises: the closure rod (16') being totally retracted from the liquid passage (2) so as to expose the passage completely, said liquid passage being rectilinear, and said closure rod (16') when viewed from a side having a configuration of a sector of a finite circle, and in the inner sleeve near the gating at least one hole (27) for passage of the closure rod.

6. A closure system according to claim 5, in which an end of the closure rod, facing away from the gating, is coupled to a slider (31) which is reciprocable in a channel (33) having a height in a plane defined by a longitudinal axis of the closure rod such that when the closure rod is mounted, the closure rod can be coupled to the slider.

7. A closure system according to claim 6, in which the closure rod is provided with a pin (29), extending transversely to a plane defined by a longitudinal axis of the closure rod, said pin fitting in a fork (30) of the slider, said fork having such a height that in an open condition the pin just cooperates with the fork.

8. A closure system according to claim 6, in which the slider (31) has a rectangular transverse cross-section.

9. A closure system according to claim 5, in which the hole (27) in the inner sleeve (19) and an opening (28) in a casing (20) surrounding said inner sleeve (19) are connected by means of a second sleeve (35).

10. A closure system according to claim 7, in which the second sleeve (35) is at an angle to a direction of liquid flow along said inner sleeve (19).

11. A closure system according to claim 5, in which the gating and the closure rod (16') have circular transverse cross-sections.

12. A closure system according to claim 5, in which the closure rods of various closure systems are mutually connected so as to be simultaneously opened and closed.

* * * * *